(12) United States Patent
Tsuboi et al.

(10) Patent No.: US 9,807,333 B2
(45) Date of Patent: Oct. 31, 2017

(54) IMAGING APPARATUS AND IMAGING SYSTEM

(71) Applicant: CANON KABUSHIKI KAISHA, Tokyo (JP)

(72) Inventors: Toshiki Tsuboi, Tokyo (JP); Takashi Muto, Kawasaki (JP)

(73) Assignee: Canon Kabushiki Kaisha, Tokyo (JE)

(*) Notice: Subject to any disclaimer, the term of this patent is extended or adjusted under 35 U.S.C. 154(b) by 13 days.

(21) Appl. No.: 15/140,236

(22) Filed: Apr. 27, 2016

(65) Prior Publication Data
    US 2016/0329371 A1    Nov. 10, 2016

(30) Foreign Application Priority Data
    May 7, 2015 (JP) ................................. 2015-095235

(51) Int. Cl.
    *H04N 5/378*    (2011.01)
(52) U.S. Cl.
    CPC .................................. *H04N 5/378* (2013.01)
(58) Field of Classification Search
    CPC .... H04N 3/1512; H04N 5/374; H04N 5/3741; H04N 5/3745; H04N 5/37452; H04N 5/37455; H04N 5/37457; H04N 5/3742; H04N 5/3743; H01L 27/14643; H01L 27/14645; H01L 27/14609; H01L 27/1461; H01L 27/14612
    See application file for complete search history.

(56) References Cited

U.S. PATENT DOCUMENTS

| 8,599,295 B2* | 12/2013 | Matsumoto | H04N 5/3575 348/241 |
| 2010/0245647 A1* | 9/2010 | Honda | H01L 27/14634 348/308 |

FOREIGN PATENT DOCUMENTS

JP    2012-010008 A    1/2012

* cited by examiner

*Primary Examiner* — Mekonnen Dagnew
(74) *Attorney, Agent, or Firm* — Canon USA, Inc. IP Division

(57) ABSTRACT

An imaging apparatus according to an exemplary embodiment includes pixels, reading circuits, first current sources each including a first transistor, second current sources each including a second transistor, a first control unit configured to control outputting a current from the first transistor to the reading circuit, and a second control unit configured to perform selectively supplying a voltage to a gate of the second transistor and holding a voltage at the gate of the second transistor. When the second control unit supplies the voltage to the gate of the second transistor, the second transistor supplies the reference current and the first control unit stops outputting the current from the first transistor to the reading circuit. When the second control unit holds the voltage at the gate of the second transistor, the first control unit causes the first transistor to output the current from the first transistor to the reading circuit.

17 Claims, 9 Drawing Sheets

IMAGING APPARATUS AND IMAGING SYSTEM

BACKGROUND OF THE INVENTION

Field of the Invention

The present disclosure relates to an imaging apparatus and an imaging system.

Description of the Related Art

A solid-state image sensor discussed in Japanese Patent Application Laid-Open No. 2012-010008 (FIG. 1) includes a pixel array portion 1 composed of a plurality of pixels 10 arranged in a matrix pattern and a current source circuit unit 2. A vertical signal line VL is disposed for each column of the plurality of pixels 10 disposed in the matrix pattern. The current source circuit unit 2 is constituted by a plurality of current source circuits 20. Each current source circuit 20 is connected to a corresponding vertical signal line VL.

SUMMARY OF THE INVENTION

An imaging apparatus according to an exemplary embodiment includes a plurality of pixels constituting a plurality of pixel columns; a plurality of reading circuits each including an output line, connected to one of the plurality of pixel columns, to which signals from a part of the plurality of pixels are output and a signal processing circuit configured to receive the signals via the output line; a plurality of first current sources provided in association with the plurality of reading circuits, each of the plurality of first current sources including a first transistor configured to supply a current to one of the plurality of reading circuits; a plurality of second current sources each including a second transistor configured to supply a reference current to be used as a reference by at least one of the plurality of first current sources; a first control unit configured to control outputting a current from the first transistor to the reading circuit; and a second control unit configured to perform selectively supplying a voltage to a gate of the second transistor and holding a voltage at the gate of the second transistor. When the second control unit supplies the voltage to the gate of the second transistor, the second transistor supplies the reference current and the first control unit stops outputting the current from the first transistor to the reading circuit. When the second control unit holds the voltage at the gate of the second transistor, the first control unit causes the first transistor to output the current from the first transistor to the reading circuit.

An imaging apparatus according to another exemplary embodiment includes a plurality of pixels constituting a plurality of pixel columns; a plurality of reading circuits each including an output line, connected to one of the plurality of pixel columns, to which signals from a part of the plurality of pixels are output and a signal processing circuit configured to receive the signals via the output line; a plurality of first current sources provided in association with the plurality of reading circuits, each of the plurality of first current sources including a first transistor configured to supply a current to one of the plurality of reading circuits; a plurality of second current sources each including a second transistor configured to supply a reference current; a plurality of third transistors provided in association with the plurality of second current sources, each being configured to receive the reference current from the second transistor and each constituting a current mirror circuit with each of the first transistors included in at least two of the plurality of first current sources; a first switch connecting the first transistor and the reading circuit; and a second switch connected to a gate of the second transistor and configured to set the gate of the second transistor into an electrically floating state.

According to other aspects of the present disclosure, one or more additional imaging apparatuses and one or more imaging systems are discussed herein. Further features of the present disclosure will become apparent from the following description of exemplary embodiments with reference to the attached drawings.

DESCRIPTION OF THE EMBODIMENTS

Figure 1:
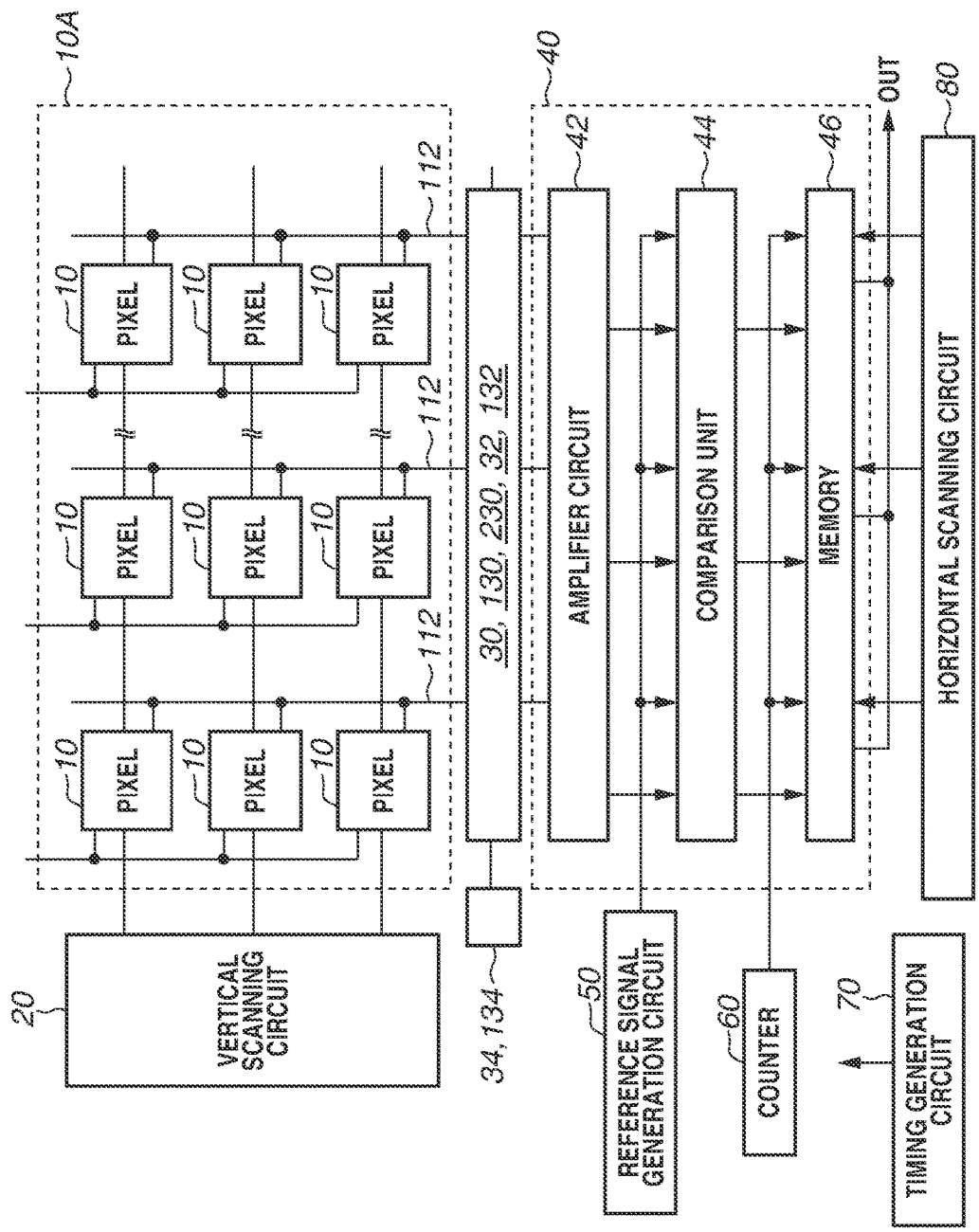
FIG. 1 schematically illustrates a configuration of an imaging apparatus.

Some of exemplary embodiments according to the present disclosure may improve the image quality of an imaging apparatus.

The solid-state image sensor discussed in Japanese Patent Application Laid-Open No. 2012-010008 temporarily stops the current supply from the current source circuit 20 to the vertical signal line VL during a sampling of a gate voltage of a transistor 21 included in the current source circuit 20. More specifically, when a second switch 23 turns on and a current control circuit 5 supplies a voltage Vgate to the gate of the transistor 21, a first switch 22 is in an OFF state. Further, the solid-state image sensor restarts the current supply from the current source circuit 20 to the vertical signal line VL after completing the holding of the gate voltage of the transistor 21. More specifically, the gate voltage of the transistor 21 can be held when the second switch 23 turns off. Subsequently, the first switch 22 turns on.

However, the solid-state image sensor discussed in Japanese Patent Application Laid-Open No. 2012-010008 has a problem that the image quality deteriorates. According to the technique discussed in Japanese Patent Application Laid-Open No. 2012-010008, the first switch 22 is kept in the OFF state during the sampling of the gate voltage of the transistor 21. Therefore, a drain voltage of the transistor 21 decreases until it substantially reaches a ground voltage level. Subsequently, if the first switch 22 turns on to output the current from the current source circuit 20 to the vertical signal line VL, the drain voltage of the transistor 21 fluctuates. At this moment, the gate voltage of the transistor 21 is in a holding state. More specifically, the gate of the transistor 21 is electrically floating. Accordingly, there is a possibility that a variation of the drain voltage may change the gate voltage of the transistor 21 via a capacity coupling between the drain and the gate. As a result, there is a possibility that the image quality deteriorates because of a variation of the current output from the current source circuit 20.

Exemplary embodiments of the present disclosure will be described in detail below with reference to attached drawings. FIG. 1 is a block diagram schematically illustrating an entire configuration of an imaging apparatus according to the present exemplary embodiment. The imaging apparatus illustrated in FIG. 1 includes a plurality of pixels 10 that constitutes a pixel array 10A composed of a plurality of pixel columns. More specifically, the pixel array 10A includes nine pixels 10 that constitute three pixel rows and three pixel columns. However, the total number of the plurality of pixels 10 is not limited to nine and the total number of the plurality of pixel columns is not limited to three.

The imaging apparatus includes a plurality of reading circuits. Each reading circuit includes an output line 112 and a signal processing circuit 40. In some exemplary embodiments, the plurality of reading circuits is provided in association with the plurality of pixel columns. More specifically, each of the plurality of reading circuits is provided for a corresponding one of the plurality of pixel columns that are mutually different.

The pixels 10 included in one pixel column are connected to one output line 112. In other words, the imaging apparatus illustrated in FIG. 1 is configured to output signals from a part of the plurality of pixels 10 constituting the pixel array 10A, more specifically, a group of pixels 10 included in one pixel column, to the output line 112.

The signal output to the output line 112 can be input to a corresponding signal processing circuit 40. More specifically, the signal processing circuit 40 is configured to receive the signal output to the output line 112. The signal processing circuit 40 performs various processing, such as amplification, buffering, comparison, sample-holding, and analog to digital conversion (hereinafter, referred to as "AD conversion") on the signal output to the output line 112. A signal transmission circuit, such as a buffer, a switch, an amplifier circuit, or a clamp circuit, can be disposed on an electric path extending between the output line 112 and the signal processing circuit 40. In FIG. 1, one block represents a plurality of elements included in the plurality of reading circuits. For example, in FIG. 1, one block representing an amplifier circuit 42 indicates that amplifier circuit 42 is included in each of the plurality of reading circuits.

The imaging apparatus includes a plurality of first current sources 30 and a plurality of second current sources 32. FIG. 1 schematically illustrates one block that includes the plurality of first current sources 30 and the plurality of second current sources 32.

Figure 2:
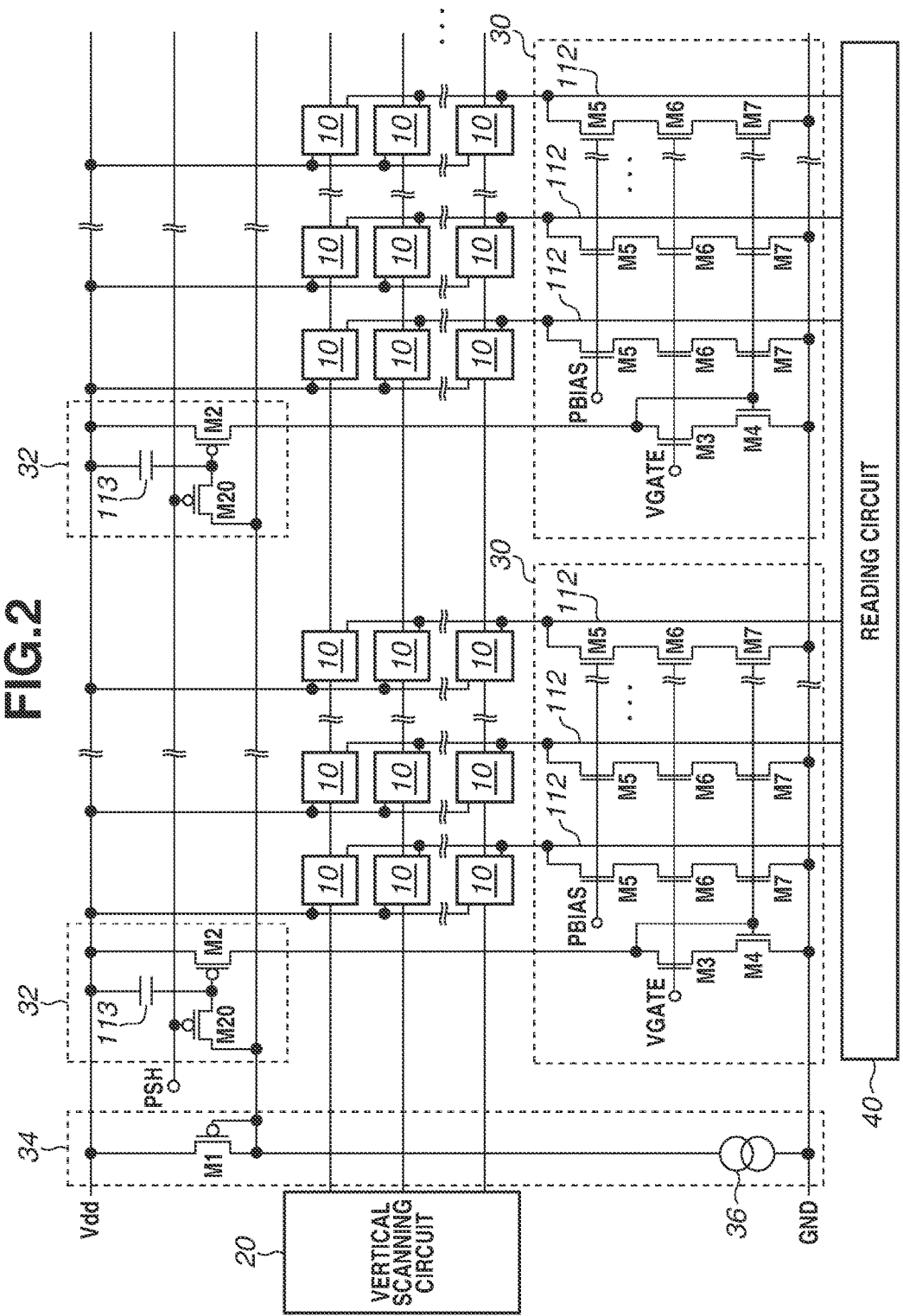
FIG. 2 illustrates an equivalent circuit of the imaging apparatus.

The plurality of first current sources 30 are provided for the plurality of reading circuits. Each of the plurality of first current sources 30 includes a first transistor that can supply current to a corresponding reading circuit. A transistor M7 illustrated in FIG. 2 is an example of the first transistor. In some exemplary embodiments, when the first transistor supplies a current to the output line 112, an amplifying transistor of the pixel 10 and the first transistor cooperatively constitute a source follower circuit. In some exemplary embodiments, the first transistor supplies a current to the signal processing circuit 40.

The imaging apparatus includes the plurality of second current sources 32. Each of the plurality of second current sources includes a second transistor that supplies a reference current to at least one of the plurality of first current sources 30. A transistor M2 illustrated in FIG. 2 is an example of the second transistor. In some exemplary embodiments, the first transistor included in the first current source 30 and a third transistor, which receives a current from the second transistor, cooperatively constitute a current mirror circuit. According to the above-mentioned configuration, the first current source 30 can supply a current to the reading circuit with reference to the reference current supplied from the second transistor.

In some exemplary embodiments, the total number of the plurality of first current sources 30 is equal to the total number of the plurality of second current sources 32. In this case, the reference current from a second transistor can be exclusively referred to by the first transistor included in a corresponding first current source 30.

In some exemplary embodiments, the total number of the second current sources 32 is less than the total number of the plurality of first current sources 30. In this case, the reference current from a second transistor can be commonly referred to by the first transistors included in two or more first current sources 30. More specifically, a single second transistor and a plurality of first transistors included in two or more first current sources 30 cooperatively constitute a current mirror circuit.

Further, in some exemplary embodiments, a plurality of second current sources 32 is provided for N pieces of pixel columns, in which N is a natural number equal to or greater than 2. In this case, the reference current from a single second transistor can be commonly referred to by the first transistors included in the N pieces of first current sources 30. More specifically, a single second transistor and a plurality of first transistors included in the N pieces of first current sources 30 cooperatively constitute a current mirror circuit.

The imaging apparatus includes a first control unit that can control a current to be output from the first transistor included in the first current source 30 to the reading circuit. In some exemplary embodiments, the first control unit includes a first switch that connects the first transistor included in the first current source 30 and the reading circuit. A transistor M5 illustrated in FIG. 2 is an example of the first switch.

The imaging apparatus includes a second control unit that can selectively perform voltage supply to a gate of the second transistor included in the second current source 32 and holding of the gate voltage. For example, the second control unit supplies the voltage to the gate of the second transistor by electrically connecting a voltage supply unit and the gate of the second transistor. For example, the second control unit holds the gate voltage of the second transistor by bringing the gate of the second transistor into an electrically floating state. In some exemplary embodiments, the second control unit includes a second switch that connects the voltage supply unit to the gate of the second transistor or brings the gate of the second transistor into an electrically floating state. A transistor M20 illustrated in FIG. 2 is an example of the second switch.

When the second control unit supplies the voltage to the gate of the second transistor, the second transistor supplies the reference current and the first control unit stops the current output from the first transistor to the reading circuit. Further, in a state where the second control unit holds the gate voltage of the second transistor, the first control unit causes the first transistor to output the current to reading circuit.

The present exemplary embodiment brings an effect of improving the image quality of the imaging apparatus as described in detail below. The second transistor supplies the reference current when the voltage is supplied to the gate of the second transistor. Therefore, a voltage corresponding to the reference current is generated between the source and the drain of the second transistor. Accordingly, when the second control unit holds the gate voltage of the second transistor, it is feasible to reduce or eliminate a change occurring in the drain voltage of the second transistor. As a result, it is feasible to reduce the variation in the gate voltage of the second transistor.

Some exemplary embodiments of the present disclosure will be described in detail below. Unless specifically mentioned, the following description of the present exemplary embodiment is applicable to other exemplary embodiments. Further, a part of the configuration of an exemplary embodiment can be replaced by a part of another exemplary embodiment or can be added to another exemplary embodiment.

An imaging apparatus according to a first exemplary embodiment will be described in detail below. The imaging apparatus according to the present exemplary embodiment includes a plurality of first current sources 30 provided in association with a plurality of pixel columns and a plurality of second current sources 32 each being provided for N pieces of pixel columns. Further, the amplifying transistor M8 included in the pixel 10 and the transistor M7 included in the first current source 30 cooperatively constitute a source follower circuit.

The above-mentioned configuration causes the transistor M2 to supply the reference current and stops the current output from the transistor M7 to the output line 112 when the voltage is supplied to the gate of the transistor M2 included in the second current source 32. Further, when the voltage is held at the gate of the transistor M2, the transistor M7 outputs a current to the output line 112.

FIG. 1 is a block diagram schematically illustrating the entire configuration of the imaging apparatus according to the present exemplary embodiment. A plurality of pixels 10 disposed in an imaging region constitutes the pixel array 10A that is composed of a plurality of pixel columns and a plurality of pixel rows. A group of pixels 10 included in one pixel row can be selected by a driving signal from a vertical scanning circuit 20. Further, signals of a plurality of pixels 10 included in the pixel row selected based on a driving signal from the vertical scanning circuit 20 can be output to a plurality of output lines 112 in parallel to each other. Sequentially performing the above-mentioned control for a plurality of pixel rows causes the pixel array 10A to output the signals to the output lines 112.

A first current source 30 is connected to each output line 112. The first current source 30 supplies a current to the output line 112. The first current source 30 is connected to a second current source 32. The second current source 32 supplies a reference current to the first current source 30. A voltage supply unit 34 supplies a voltage to the second current source 32. The voltage supply unit 34 can be omitted if desired. For example, an external voltage can be directly supplied to the second current source 32 in a case where the voltage supply unit 34 is omitted.

The signal output to the output line 112 can be input to the signal processing circuit 40. The signal processing circuit 40 performs predetermined signal processing on the signal output to the output line 112. The signal processing circuit 40 according to the present exemplary embodiment includes the amplifier circuit 42 that can amplify the signal received from the output line 112 and an analog to digital conversion circuit (hereinafter, referred to as "AD conversion circuit") that can convert the signal received from the output line 112 into a digital signal. The AD conversion circuit includes a comparison unit 44 and a memory 46. The comparison unit 44 inputs a reference signal generated by a reference signal generation circuit 50. The comparison unit 44 compares the signal output to the output line 112 with the reference signal. Then, at inversion timing of an output from the comparison unit 44, a count value of a counter 60 is stored in the memory unit 44. The count value held in the memory 46 can be read as a digital signal based on a driving signal from a horizontal scanning circuit 80. A timing generation circuit 70 generates a clock signal that can control each of the vertical scanning circuit 20, the amplifier circuit 42, the comparison unit 44, the memory 46, the reference signal generation circuit 50, the counter 60, and the horizontal scanning circuit 80.

The signal processing circuit 40 according to the present exemplary embodiment can convert an analog signal from the pixel 10 into a digital signal. However, the signal processing circuit 40 can be configured to output the analog signal from the pixel 10 directly to an external device provided outside the imaging apparatus. In this case, the AD conversion circuit can be omitted.

FIG. 2 illustrates an equivalent circuit of the imaging apparatus according to the present exemplary embodiment. A portion similar to that illustrated in FIG. 1 is denoted by the same reference numeral used in FIG. 1. Further, the reference signal generation circuit 50, the counter 60, and the horizontal scanning circuit 80 are not illustrated in FIG. 2. The configuration of a pixel column described in detail below is similar to that of the remaining pixel columns.

A transistor M1 and each of the transistors M2 illustrated in FIG. 2 can be constituted by a P-channel type MOS transistor. Each of the transistors M3 to M7 and the transistors M20 illustrated in FIG. 2 can be constituted by an N-channel type MOS transistor.

The imaging apparatus according to the present exemplary embodiment includes the voltage supply unit 34 that includes the transistor M1 and a reference current source 36. The reference current source 36 can be constituted by a conventional current source. The transistor M1 and the reference current source 36 are connected in series on an electric path extending from a power source node to a ground node. A power source voltage Vdd is supplied, as a first reference voltage, to the power source node. A ground voltage GND is supplied, as a second reference voltage, to the ground node. The transistor M1 has a gate and a drain that are mutually connected. The transistor M1 has a source that is connected to the power source node. According to the above-mentioned configuration, the gate (or drain) voltage of the transistor M1 is determined by the current supplied from the reference current source 36. The voltage supply unit 34 supplies the gate (or drain) voltage of the transistor M1 to the plurality of second current sources 32.

Each of the plurality of second current sources 32 includes the transistor M2. The transistor M1 and the transistor M2 cooperatively constitute a current mirror circuit. More specifically, the gate of the transistor M2 is connected to the gate and the drain of the transistor M1 via the transistor M20. The source of the transistor M2 is connected to the power source node. According to the above-mentioned configuration, the transistor M2 generates a mirror output of the current flowing through the transistor M1. The current output from the transistor M2 serves as the reference current for the first current source 30.

In the present exemplary embodiment, the transistor M3 receives the reference current output from the transistor M2. More specifically, the transistor M2 and the transistor M3 are connected in series on an electric path extending from the power source node to the ground node.

The transistor M20 is a switch (hereinafter, referred to as "second switch M20") that connects the gate of the transistor M2 to the voltage supply unit 34. A driving signal PSH, which can controls ON/OFF of the second switch M20, is supplied to the second switch M20. When the second switch M20 turns on, the voltage from the voltage supply unit 34 can be supplied to the gate of the transistor M2. When the second switch M20 turns off, the gate of the transistor M2 is brought into a floating state. More specifically, when the second switch M20 turns off, the gate voltage of the transistor M2 can be held.

The second current source 32 according to the present exemplary embodiment includes a capacitive element 113. The capacitive element 113 includes a first terminal and a second terminal. The first terminal is connected to the gate of the transistor M2. The second terminal is connected to the power source node. The capacitive element 113 brings an effect of substantially increasing the gate capacity of the transistor M2. Therefore, the image quality can be improved. However, the capacitive element 113 can be removed if desired.

Each of the plurality of first current sources 30 includes the transistor M7. The transistor M7 and a transistor M4 (i.e., a transistor that receives the current from the transistor M2) cooperatively constitute a current mirror circuit. More specifically, a gate of the transistor M7 is connected to a gate and a drain of the transistor M4. According to the above-mentioned configuration, the transistor M7 of the first current source 30 outputs a current to the output line 112 with reference to the reference current supplied from the transistor M2.

In the present exemplary embodiment, the current mirror circuit constituted by the transistor M7 and the transistor M4 includes a first gate ground circuit (or, a first gate common circuit) and a second gate ground circuit (or, a second gate common circuit). The first gate ground circuit includes a transistor M6 disposed on an electric path extending between the transistor M7 and the output line 112. The second gate ground circuit includes the transistor M3 disposed on an electric path extending between the transistor M4 and the transistor M2. A bias voltage VGATE is supplied to a gate of the transistor M3 and a gate of the transistor M6. Further, a gate of the transistor M4 and the gate of the transistor M7 are connected to a drain of the transistor M4 via the transistor M3. According to the above-mentioned configuration, the current output from the first current source 30 can be stabilized. As a result, the image quality can be improved. However, the first gate ground circuit and the second gate ground circuit can be removed if desired.

The transistor M7 of the first current source 30 is connected to the output line 112 via the transistor M5. The transistor M5 is a switch (hereinafter, referred to as "first switch M5") that connects the transistor M7 to the output line 112. A driving signal PBIAS, which can control ON/OFF of the first switch M5, is supplied to the first switch M5. When the first switch M5 turns on, the transistor M7 of the first current source 30 can output a current to the output line 112. When the first switch M5 turns off, the transistor M7 of the first current source 30 stops the current output to the output line 112.

The imaging apparatus according to the present exemplary embodiment includes a plurality of second current sources 32 each being provided for N pieces of pixel columns, in which N is a natural number equal to or greater than 2. Therefore, the reference current of one transistor M2 can be referred to by N pieces of first current sources 30 corresponding to the N pieces of pixel columns. More specifically, a set of the transistors M2, M3, and M4 is provided for the N pieces of pixel columns. Further, a set of the transistors M5, M6, and M7 is provided for each of the plurality of pixel columns. Further, one transistor M4 (i.e., the transistor that receives the current from one transistor M2) and the transistor M7 (i.e., the transistor included in the N pieces of first current sources 30) cooperatively constitute a current mirror circuit. The above-mentioned configuration brings an effect of reducing the total number of the transistors M2 each supplying the reference current. As a result, the power consumption can be reduced.

The pixel array 10A can include MxN pieces of pixel columns, in which M is a natural number equal to or greater than 2. In this case, a plurality of transistors M4 and a plurality of transistors M7 can be divided into M groups. Each group includes a single transistor M4 and N pieces of transistor M7 that constitute a current mirror circuit with the transistor M4. Similarly, a plurality of transistors M5 and a plurality of transistors M6 can be divided into M groups. In each group, the gates of N pieces of transistors M5 are connected to the common node. Further, in each group, the gates of N pieces of transistors M6 are connected to the common node. On the other hand, the gates of two transistors M5 belonging to different groups are connected to mutually different nodes. Further, the gates of two transistor M6 belonging to different groups are connected to mutually different nodes.

Figure 3:
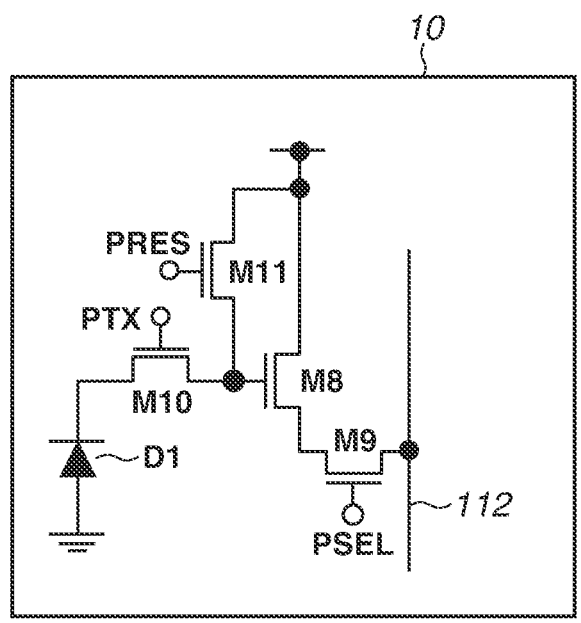
FIG. 3 illustrates an equivalent circuit of a pixel.

Next, a configuration of the pixel 10 will be described in detail below. FIG. 3 illustrates an equivalent circuit of the pixel 10. Although FIG. 3 illustrates only one pixel 10, another pixel 10 has a similar configuration.

The pixel 10 includes a photoelectric conversion unit (i.e., an optical device that includes a photodiode D1), the amplifying transistor M8, a selection transistor M9, a transfer transistor M10, and a reset transistor M11. The photoelectric conversion unit can generate a charge based on received incident light. The transfer transistor M10 can transfer the charge of the photoelectric conversion unit to a gate of the amplifying transistor M8. The reset transistor M11 can reset the gate voltage of the amplifying transistor M8. The selection transistor M9 can control the connection between the amplifying transistor M8 and the output line 112. A driving signal PSEL, a driving signal PTX, and a driving signal PRES are supplied to a gate of the selection transistor M9, a gate of the transfer transistor M10, and a gate of the reset transistor M11, respectively.

The amplifying transistor M8 of the pixel 10 is connected to the transistor M7 of the first current source 30 via the output line 112. When the transistor M7 outputs a current to the output line 112, the amplifying transistor M8 and the transistor M7 cooperatively constitute a source follower circuit. When the selection transistor M9 is in an ON state, the source follower circuit outputs a signal, based on the gate voltage of the amplifying transistor M8, to the output line 112.

Figure 4:
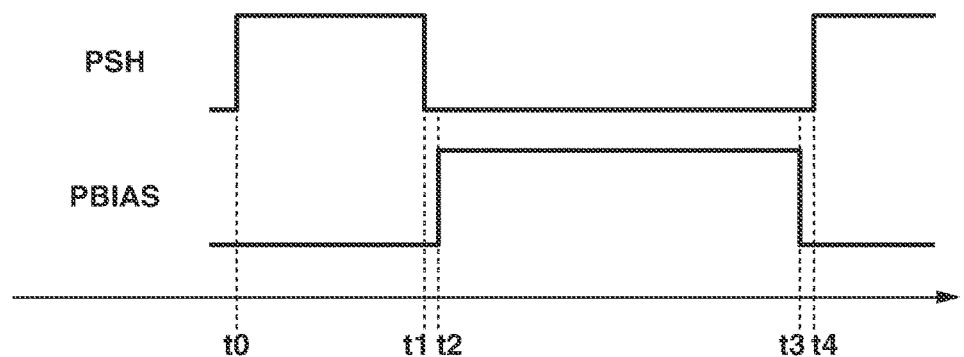
FIG. 4 is a timing chart schematically illustrating driving signals of the imaging apparatus.

Next, an operation according to the present exemplary embodiment will be described in detail below. FIG. 4 is a timing chart schematically illustrating the driving signals of the imaging apparatus. FIG. 4 illustrates the driving signal PSH and the driving signal PBIAS. When the level of each driving signal is high, a corresponding switch turns on. When the level of each driving signal is low, the corresponding switch turns off.

The imaging apparatus according to the present exemplary embodiment can perform a sampling operation for sampling the voltage from the voltage supply unit 34 at the gate of the transistor M2 included in the second current source 32. Further, the imaging apparatus according to the present exemplary embodiment can perform a holding operation for holding the gate voltage of the transistor M2. In a period from time t0 to time t1 illustrated in FIG. 4, the imaging apparatus performs the sampling operation. In a period from time t1 to time t4, the imaging apparatus performs the holding operation. The imaging apparatus determines whether to perform the sampling operation or the holding operation considering a driving state thereof.

At time t0, the driving signal PSH changes from low level to high level. Therefore, the second switch M20 turns on. While the second switch M20 is in an ON state, the voltage from the voltage supply unit 34 can be supplied to the gate of the transistor M2. More specifically, the imaging apparatus samples the voltage supplied from the voltage supply unit 34 at the gate of the transistor M2. In this case, the first switch M5 is in an OFF state because the level of the driving signal PBIAS is low. Accordingly, the transistor M7 does not supply the current to the output line 112.

At time t1, the driving signal PSH changes from high level to low level. Therefore, the second switch M20 turns off. The gate voltage of the transistor M2 can be held when the second switch M20 is in an OFF state.

At time t2, the driving signal PBIAS changes from low level to high level. Therefore, the first switch M5 turns on. The transistor M7 outputs the current to the output line 112 in response to the turning on of the first switch M5.

Next, at time t3, the driving signal PBIAS changes from high level to low level. Therefore, the first switch M5 turns off. The transistor M7 stops the current output to the output line 112 in response to the turning off of the first switch M5.

Subsequently, at time t4, the driving signal PSH changes from low level to high level. After time t4, the imaging apparatus selectively performs the sampling operation and the holding operation by repeating the operation performed in the period from time t0 to time t4.

In the present exemplary embodiment, the transistor M2 included in the second current source 32 constantly outputs the reference current when the voltage is supplied to the gate of the transistor M2. On the other hand, the transistor M7 included in the first current source 30 stops the current output when the voltage is supplied to the gate of the transistor M2 included in the second current source 32. Then, the transistor M7 restarts the current output after completion of the holding of the gate voltage of the transistor M2.

According to the above-mentioned configuration, the image quality of the imaging apparatus can be improved. Effects brought by the imaging apparatus according to the present exemplary embodiment will be described in detail below. First, when the voltage sampling at the gate of the transistor M2 is performed, the transistor M2 included in the second current source 32 supplies the reference current. The drain voltage of the transistor M2 takes a value different from the power source voltage VDD according to the reference current. In other words, a predetermined voltage is generated between the source and the drain of the transistor M2. Subsequently, the transistor M2 continuously supplies substantially the same reference current even after the holding of the gate voltage of the transistor M2 is completed. Accordingly, the drain voltage of the transistor M2 can be suppressed from changing greatly between the sampling operation and the holding operation. Therefore, the voltage variation at the gate of the transistor M2 can be suppressed appropriately even if it occurs via a coupling capacity between the gate and the drain of the transistor M2. As a result, the voltage holding at the gate of the transistor M2 can be accurately performed. The reference current can be accurately output from the transistor M2. As mentioned above, the image quality can be improved.

Further, the transistor M7 included in the first current source 30 stops the current output when the voltage sampling at the gate of the transistor M2 is performed. Therefore, the total current value of the imaging apparatus (i.e., a sum of currents flowing from the power source node to the ground node) can be reduced. Therefore, it is feasible to reduce a voltage drop occurring due to the resistance of a wiring that constitutes the power source node. More specifically, the voltage shading at the power source node can be reduced. As a result, it becomes feasible to reduce the difference between the voltages sampled at respective gates of a plurality of transistors M2. The above-mentioned voltage shading reduction effect becomes remarkable in a case where the total number of the plurality of second current sources 32 is less than the total number of the plurality of first current sources 30.

Further, the imaging apparatus according to the present exemplary embodiment performs the voltage sampling for the transistor M2 of the second current source 32 and stops the output of the first current source 30 with reference to the reference current supplied from the second current source 32. Therefore, when the transistor M7 included in the first current source 30 starts the current output after completion of the sampling, the drain voltage of the transistor M2 included in the second current source 32 remains substantially constant. Therefore, the imaging apparatus according to the present exemplary embodiment can accurately hold the voltage at the second current source while reducing the voltage shading. As a result, the image quality of the imaging apparatus can be greatly improved.

As mentioned above, the present exemplary embodiment brings the effect of improving the image quality of the imaging apparatus. In particular, the present exemplary embodiment brings an additional effect of reducing noises of signals output from the pixels 10.

An imaging apparatus according to a second exemplary embodiment will be described in detail below. The imaging apparatus according to the present exemplary embodiment is different from that described in the first exemplary embodiment in that the transistor M7 included in a first current source 130 supplies a current to the amplifier circuit 42 included in the signal processing circuit 40. Hereinafter, features not described in the first exemplary embodiment will be described in detail and redundant description of the portions similar to those described in the first exemplary embodiment will be avoided.

In the present exemplary embodiment, when the voltage is supplied to the gate of the transistor M2 included in the second current source 132, the transistor M2 supplies the reference current and the transistor M7 stops the current output to the amplifier circuit 42. Then, when the voltage is held at the gate of the transistor M2, the transistor M7 outputs the current to the amplifier circuit 42.

FIG. 1 is a block diagram schematically illustrating the entire configuration of the imaging apparatus according to the present exemplary embodiment. The imaging apparatus according to the present exemplary embodiment is different from that described in the first exemplary embodiment in that the first current source 30 is replaced by the first current source 130 and the second current source 32 is replaced by a second current source 132. Further, the voltage supply unit 34 is replaced by a voltage supply unit 134. The rest of the configuration is similar to that described in the first exemplary embodiment and therefore redundant description thereof will be avoided.

Each of a plurality of first current sources 130 can supply a current to the amplifier circuit 42 included in the signal processing circuit 40 of a corresponding pixel column. Further, each of the first current sources 30 is connected to a corresponding second current source 132. The second current source 132 can supply a reference current to the first current source 130.

Figure 5:
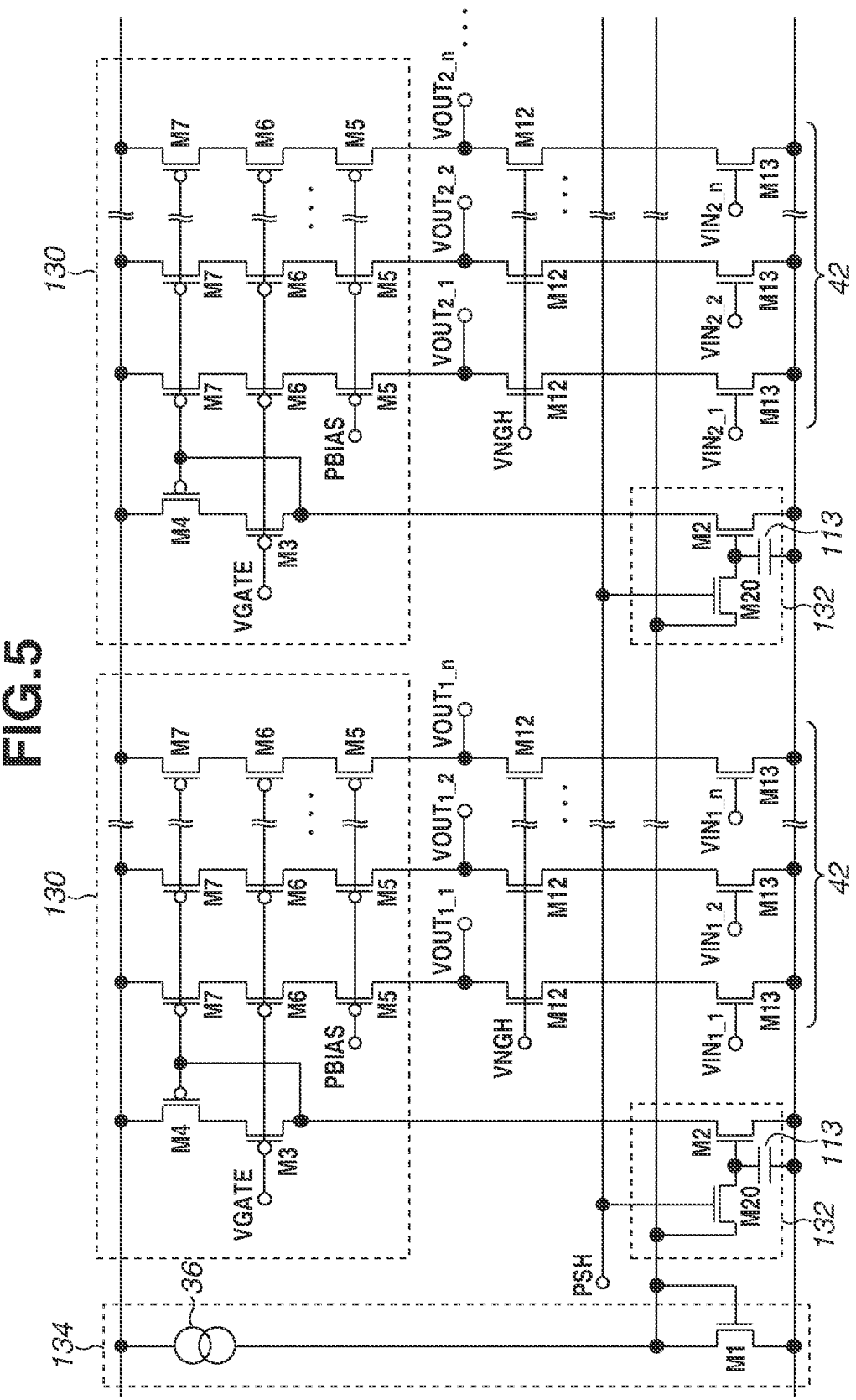
FIG. 5 illustrates an equivalent circuit of an imaging apparatus.

FIG. 5 illustrates an equivalent circuit of the imaging apparatus according to the present exemplary embodiment. A portion similar to that illustrated in FIG. 1 or FIG. 2 is denoted by the same reference numeral used in FIG. 1 or FIG. 2. Further, the comparison unit 44 and the memory 46 included in the signal processing circuit 40, the reference signal generation circuit 50, the counter 60, and the horizontal scanning circuit 80 are not illustrated in FIG. 5.

The transistor M1, the transistor M2, and the transistor M20 illustrated in FIG. 5 can be constituted by an N-channel type MOS transistor. The transistors M3 to M7 illustrated in FIG. 5 can be constituted by a P-channel type MOS transistor.

The voltage supply unit 134 according to the present exemplary embodiment is different from the voltage supply unit 34 described in the first exemplary embodiment in that the transistor M1 is connected to the ground node and the reference current source 36 is connected to the power source node. The rest of the configuration is similar to that of the voltage supply unit 34.

The second current source 132 according to the present exemplary embodiment includes the transistor M2. The source of the transistor M2 is connected to the ground node. Further, the second terminal of the capacitive element 113 included in the second current source 132 is connected to the ground node. The rest of the configuration is similar to that of the second current source 32. The source of the transistor M4 that receives the current from the transistor M2 is connected to the power source node.

The first current source 130 according to the present exemplary embodiment includes the transistor M7. The source of the transistor M7 is connected to the power source node. Further, the transistor M6 that constitutes the gate ground circuit and the first switch M5 are connected in series on an electric path extending from the transistor M7 to the ground node.

A signal Vin is input from the output line 112 to the amplifier circuit 42. The amplifier circuit 42 amplifies the input signal Vin and outputs an amplified signal Vout. The amplifier circuit 42 includes a transistor M13 and a transistor M12. Each of the transistor M12 and the transistor M13 can be constituted by an N-channel type MOS transistor. The source of the transistor M13 is connected to the ground node. The drain of the transistor M13 is connected to the output node via the transistor M12. The transistor M13 constitutes a gate ground circuit. More specifically, a bias voltage VNGH is supplied to the gate of the transistor M13.

The transistor M7 included in the first current source 130 supplies a current to the amplifier circuit 42. More specifically, the transistor M7 is disposed on an electric path extending from the transistor M12 to the power source node. According to the above-mentioned configuration, the transistor M7 can operate as a current source load of the transistor M12.

An operation according to the present exemplary embodiment is similar to that described in the first exemplary embodiment. More specifically, FIG. 4 is a timing chart schematically illustrating the driving signals of the imaging apparatus. Redundant description thereof will be avoided.

In the present exemplary embodiment, the transistor M2 included in the second current source 132 constantly outputs the reference current when the voltage is supplied to the gate of the transistor M2. On the other hand, the transistor M7 included in the first current source 130 stops the current output when the voltage is supplied to the gate of the transistor M2 included in the second current source 132. Then, the transistor M7 restarts the current output after completion of the holding of the gate voltage of the transistor M2.

Similar to the first exemplary embodiment, the above-mentioned configuration brings the effect of improving the image quality of the imaging apparatus. In particular, the present exemplary embodiment brings an additional effect of reducing noises of signals output from the amplifier circuits 42.

An imaging apparatus according to a third exemplary embodiment will be described in detail below. The imaging apparatus according to the present exemplary embodiment is different from that described in the second exemplary embodiment in that the transistor M7 included in the first current source 130 supplies a current to the AD conversion circuit included in the signal processing circuit 40. Hereinafter, features not described in the second exemplary embodiment will be described in detail and redundant description of the portions similar to those described in the first exemplary embodiment or the second exemplary embodiment will be avoided.

In the present exemplary embodiment, when the voltage is supplied to the gate of the transistor M2 included in the second current source 132, the transistor M2 supplies the reference current and the transistor M7 stops the current output to the AD conversion circuit. Then, the transistor M7 outputs the current to the AD conversion circuit when the voltage is held at the gate of the transistor M2.

FIG. 1 is a block diagram schematically illustrating the entire configuration of the imaging apparatus according to the present exemplary embodiment. The imaging apparatus according to the present exemplary embodiment includes a plurality of first current sources 130 and a plurality of second current sources 132. Each of the plurality of first current sources 130 supplies a current to the AD conversion circuit included in the signal processing circuit 40 of a corresponding pixel column. The rest of the configuration is similar to that described in the second exemplary embodiment.

Figure 6:
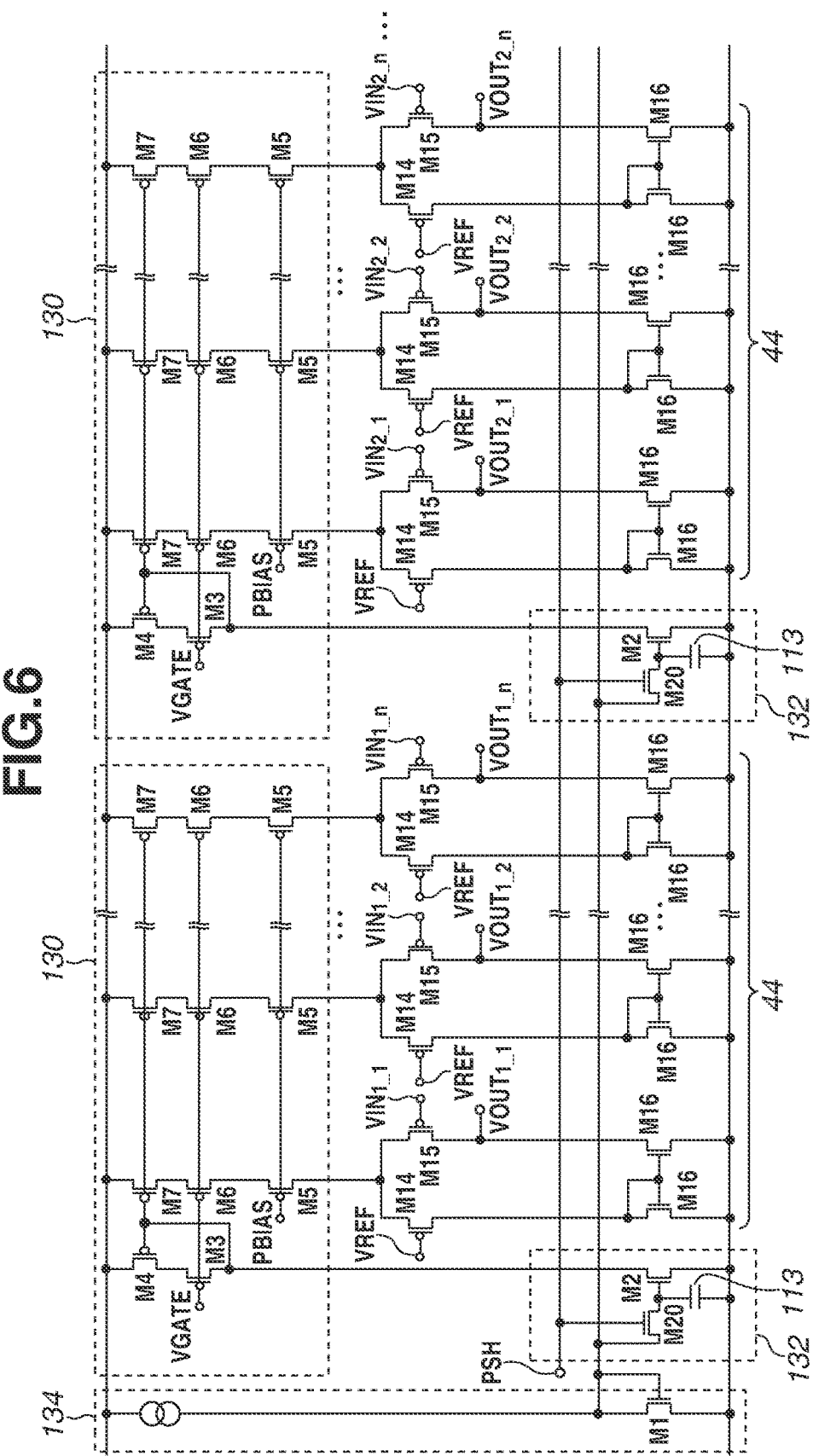
FIG. 6 illustrates an equivalent circuit of the imaging apparatus.

FIG. 6 illustrates an equivalent circuit of the imaging apparatus according to the present exemplary embodiment. A portion similar to that illustrated in FIG. 1, FIG. 2, or FIG. 5 is denoted by the same reference numeral used in FIG. 1, FIG. 2, or FIG. 5. Further, the amplifier circuit 42 and the memory 46 included in the signal processing circuit 40, the reference signal generation circuit 50, the counter 60, and the horizontal scanning circuit 80 are not illustrated in FIG. 6.

The transistor M1, the transistor M2, and the transistor M20 illustrated in FIG. 6 can be constituted by an N-channel type MOS transistor. The transistors M3 to M7 illustrated in FIG. 6 can be constituted by a P-channel type MOS transistor.

Configurations of the first current source 130, the second current source 132, and the voltage supply unit 134 according to the present exemplary embodiment are similar to those described in the second exemplary embodiment and therefore redundant description thereof will be avoided.

FIG. 6 illustrates the comparison unit 44 included in the AD conversion circuit. The signal Vin is input from the output line 112 to a first input node of the comparison unit 44. A reference signal Vref generated by the reference signal generation circuit 50 is input to a second input node of the comparison unit 44. The comparison unit 44 compares the signal Vin input from the output line 112 with the reference signal Vref. For example, a ramp signal can be used as the reference signal Vref.

The comparison unit 44 includes a transistor M14 and a transistor M15, which cooperatively constitute a differential pair. The transistor M14 and the transistor M15 can be constituted by a P-channel type MOS transistor. A current mirror circuit constituted by two transistors M16 is connected to a drain of the transistor M14 and a drain of the transistor M15. The transistor M16 can be constituted by an N-channel type MOS transistor. The drain of the transistor M15 is an output node of the comparison unit 44.

The transistor M7 included in the first current source 130 supplies a current to the comparison unit 44. More specifically, the source of the transistor M14 and the source of the transistor M15 are connected to the transistor M7 included in the first current source 130. According to the above-mentioned configuration, the transistor M7 can operate as a tail current source of the comparison unit 44. The transistor M7 and the transistor M14 to M16 cooperatively constitute a differential amplifier circuit.

An operation according to the present exemplary embodiment is similar to that described in the first exemplary embodiment. More specifically, FIG. 4 is a timing chart schematically illustrating the driving signals of the imaging apparatus. Redundant description thereof will be avoided.

In the present exemplary embodiment, the transistor M2 included in the second current source 132 constantly outputs the reference current when the voltage is supplied to the gate of the transistor M2. On the other hand, the transistor M7 included in the first current source 130 stops the current output when the voltage is supplied to the gate of the transistor M2 included in the second current source 132. Then, the transistor M7 restarts the current output after completion of the holding of the gate voltage of the transistor M2.

Similar to the first exemplary embodiment, the above-mentioned configuration brings the effect of improving the image quality of the imaging apparatus. In particular, the present exemplary embodiment brings an additional effect of improving the accuracy of AD conversion performed by the AD conversion circuit.

An imaging apparatus according to a fourth exemplary embodiment will be described in detail below. The imaging apparatus according to the present exemplary embodiment is different from the first exemplary embodiment in that a first current source 230 includes a control unit that can selectively perform voltage supply to the gate of the transistor M7 included in the first current source 230 and holding of the gate voltage of the transistor M7. Hereinafter, features not described in the first exemplary embodiment will be described in detail and redundant description of the portions similar to those described in the first exemplary embodiment will be avoided.

FIG. 1 is a block diagram schematically illustrating the entire configuration of the imaging apparatus according to the present exemplary embodiment. The first current source 30 described in the first exemplary embodiment is replaced by the first current source 230. The rest of the configuration is similar to that described in the first exemplary embodiment and therefore redundant description thereof will be avoided.

Figure 7:
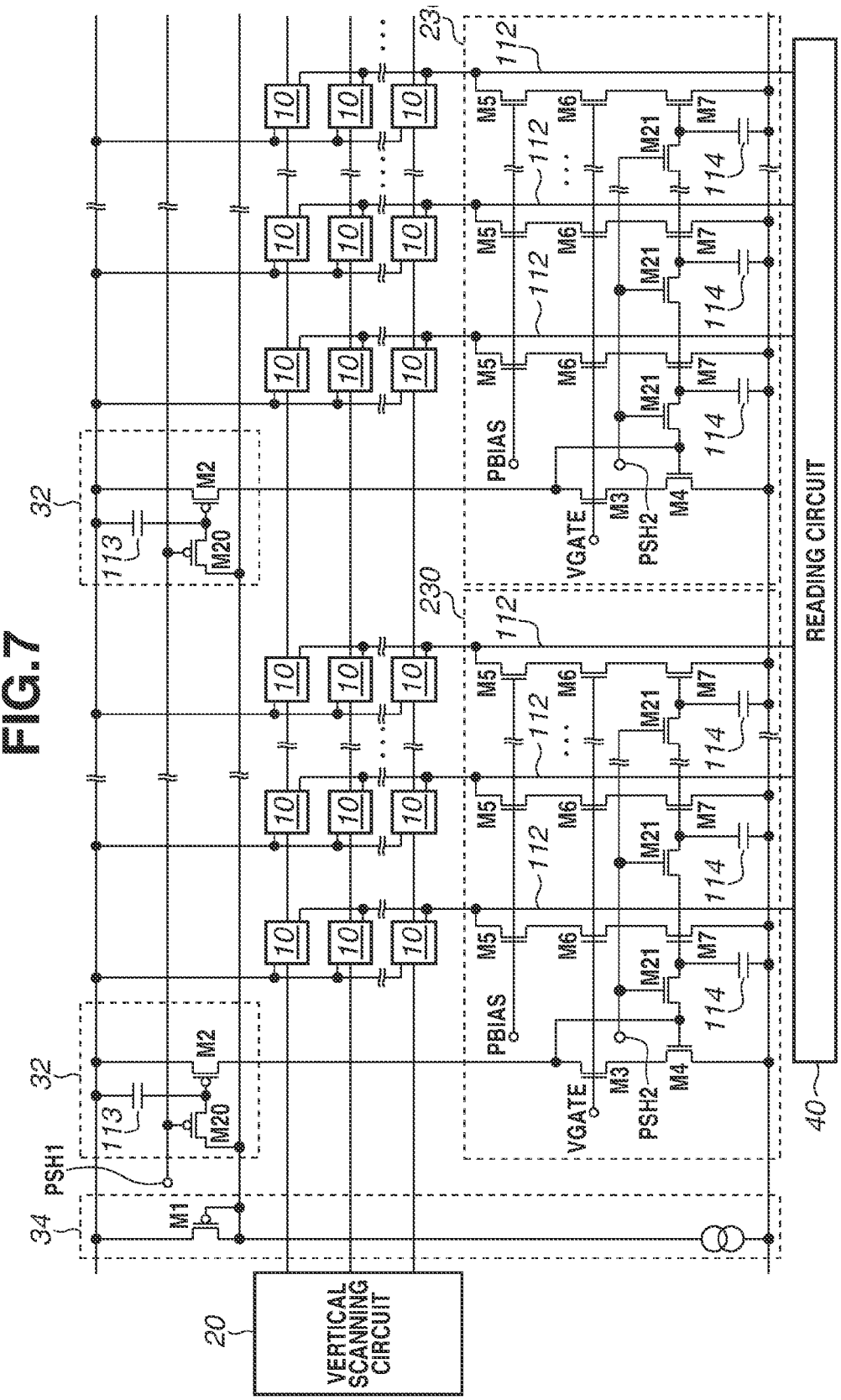
FIG. 7 illustrates an equivalent circuit of an imaging apparatus.

FIG. 7 illustrates an equivalent circuit of the imaging apparatus according to the present exemplary embodiment. A portion similar to that illustrated in FIG. 2 is denoted by the same reference numeral used in FIG. 2. The reference signal generation circuit 50, the counter 60, and the horizontal scanning circuit 80 are not illustrated in FIG. 7. The configuration of a pixel column described in detail below is only an example and similar to that of the remaining pixel columns.

The first current source 230 according to the present exemplary embodiment includes a transistor M21 (hereinafter, referred to as "third switch M21") connected to the gate of the transistor M7. A driving signal PSH2, which can control ON/OFF of the third switch M21, is supplied to the third switch M21. When the third switch M21 turns on, the gate of the transistor M7 is connected to the drain of the transistor M2 included in the second current source 32 and the gate of the transistor M4. When the third switch M21 turns off, the gate of the transistor M7 is brought into an electrically floating state. According to the above-mentioned configuration, the third switch can selectively perform the voltage supply to the gate of the transistor M7 and the holding of the gate voltage of the transistor M7.

The first current source 230 according to the present exemplary embodiment includes a capacitive element 114. The capacitive element 114 includes a first terminal and a second terminal. The first terminal is connected to the gate of the transistor M7. The second terminal is connected to the ground node. The capacitive element 114 brings an effect of substantially increasing the gate capacity of the transistor M7. Therefore, the image quality can be improved. However, the capacitive element 114 can be removed.

The rest of the configuration of the first current source 230 is similar to that of the first current source 30 described in the first exemplary embodiment. In the present exemplary embodiment, a driving signal PSH1 is supplied to the second switch M20.

Figure 8:
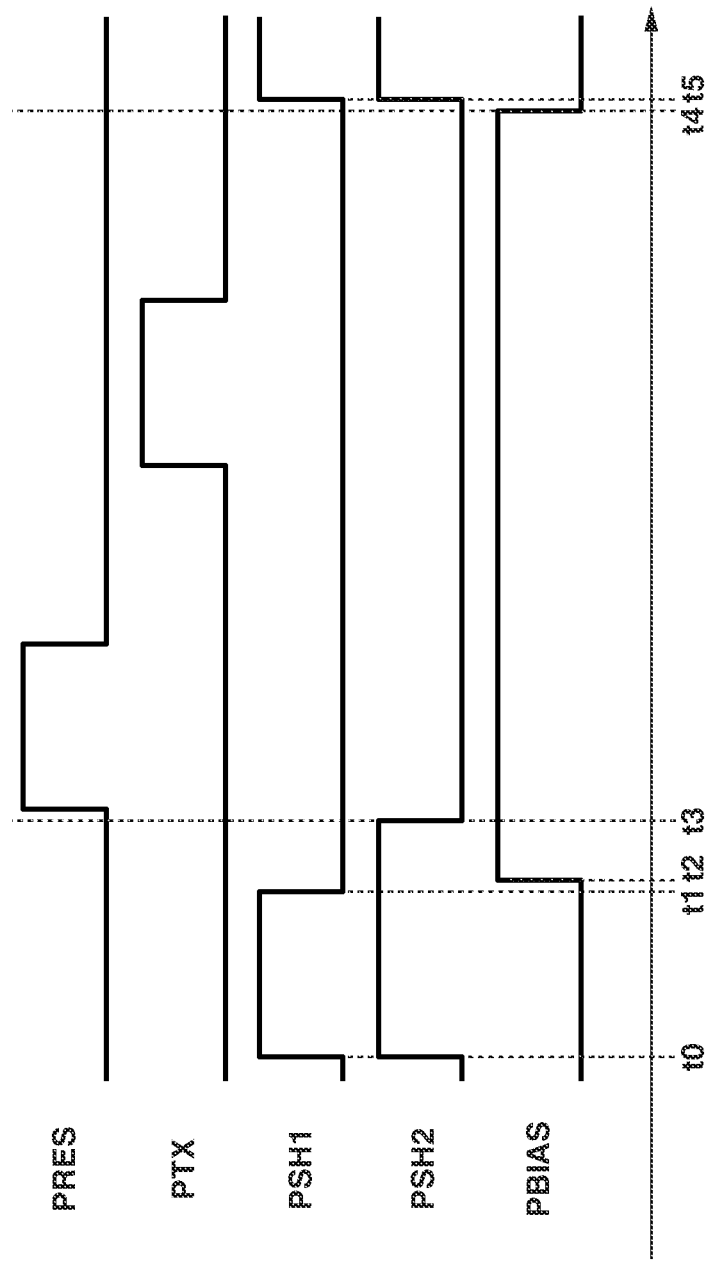
FIG. 8 is a timing chart schematically illustrating driving signals of the imaging apparatus.

Next, an operation according to the present exemplary embodiment will be described in detail below. FIG. 8 is a timing chart schematically illustrating driving signals of the imaging apparatus. FIG. 8 illustrates the driving signal PSH1, the driving signal PSH2, the driving signal PBIAS, a driving signal PRES, and the driving signal PTX. When the level of each driving signal is high, a corresponding switch (or transistor) turns on. When the level of each driving signal is low, a corresponding switch (or transistor) turns off.

The imaging apparatus according to the present exemplary embodiment can perform a sampling operation for sampling the voltage from the voltage supply unit 34 at the gate of the transistor M2 included in the second current source 32. Further, the imaging apparatus according to the present exemplary embodiment can perform a holding operation for holding the gate voltage of the transistor M2. In a period from time t0 to time t1 illustrated in FIG. 8, the imaging apparatus performs the sampling operation at the second current source 32. In a period from time t1 to time t5, the imaging apparatus performs the holding operation at the second current source 32.

Further, the imaging apparatus according to the present exemplary embodiment can perform a sampling operation for sampling the voltage at the gate of the transistor M7 included in the first current source 230. Further, the imaging apparatus can perform a holding operation for holding the gate voltage of the transistor M7. In a period from time t0 to time t3 illustrated in FIG. 8, the imaging apparatus performs the sampling operation at the first current source 230. In a period from time t3 to time t5, the imaging apparatus performs the holding operation at the first current source 230. The imaging apparatus determines whether to perform the sampling operation or the holding operation at each current source considering a driving state thereof.

At time t0, each of the driving signal PSH1 and the driving signal PSH2 changes from low level to high level. Therefore, the second switch M20 and the third switch M21 turn on. The voltage is supplied to the gate of the transistor M2 and the gate of the transistor M7. In this case, the first switch M5 is in an OFF state because the level of the driving signal PBIAS is low. Accordingly, the transistor M7 stops the current supply to the output line 112.

At time t1, the driving signal PSH1 changes from high level to low level. Therefore, the second switch M20 turns off. The gate voltage of the transistor M2 can be held when the second switch M20 is in an OFF state.

At time t2, the driving signal PBIAS changes from low level to high level. Therefore, the first switch M5 turns on. When the first switch M5 turns on, the transistor M7 outputs a current to the output line 112.

Subsequently, at time t3, the driving signal PSH2 changes from high level to low level. Therefore, the third switch M21 turns off. The gate voltage of the transistor M7 can be held in response to the turning off of the third switch M21.

Next, at time t4, the driving signal PBIAS changes from high level to low level. Therefore, the first switch M5 turns off. The transistor M7 stops the current output to the output line 112 in response to the turning off of the first switch M5.

Subsequently, at time t5, each of the driving signal PSH1 and the driving signal PSH2 changes from low level to high level. After time t5, the imaging apparatus selectively performs the sampling operation and the holding operation by repeating the operation performed in the period from time t0 to time t5.

In a period from time t3 to time t4, the pixel 10 performs an operation to output a signal to the output line 112. First, the gate voltage of the amplifying transistor M8 can be reset when the level of the driving signal PRES becomes high. The level of the driving signal PTX becomes high after the level of the driving signal PRES is changed to low. Therefore, the charge of the photodiode D1 can be transferred to the gate of the amplifying transistor M8. Through the above-mentioned operation, the signal from the pixel 10 can be output to the output line 112.

In the present exemplary embodiment, each of a plurality of first current sources 230 includes the third switch M21 connected to the transistor M7. The third switch M21 can hold the gate voltage of the transistor M7. The above-mentioned configuration brings an effect of reducing noises.

If strong light enters the photodiode D1 of the pixel 10 belonging to a specific pixel column, a large voltage variation occurs in the output line 112 corresponding to the specific pixel column. The voltage variation of the output line 112 may induce, via the coupling capacity, a voltage variation at the gate of the transistor M7 included in the first current source 230 belonging to another pixel column. As a result, noises may occur. However, the present exemplary embodiment can prevent the voltage of the output line 112 from varying because the third switch M21 holds the gate voltage of the transistor M7. In particular, in a case where a wiring that supplies the voltage to the gate of the transistor M7 extends in a direction intersectional to the output line 112, the voltage of the wiring tends to change. In the above-mentioned configuration, the effect of reducing noises is remarkable.

As mentioned above, the present exemplary embodiment brings the effect of improving the image quality of the imaging apparatus. In particular, the present exemplary embodiment brings an additional effect of reducing the noise occurring when the strong light enters.

Figure 9:
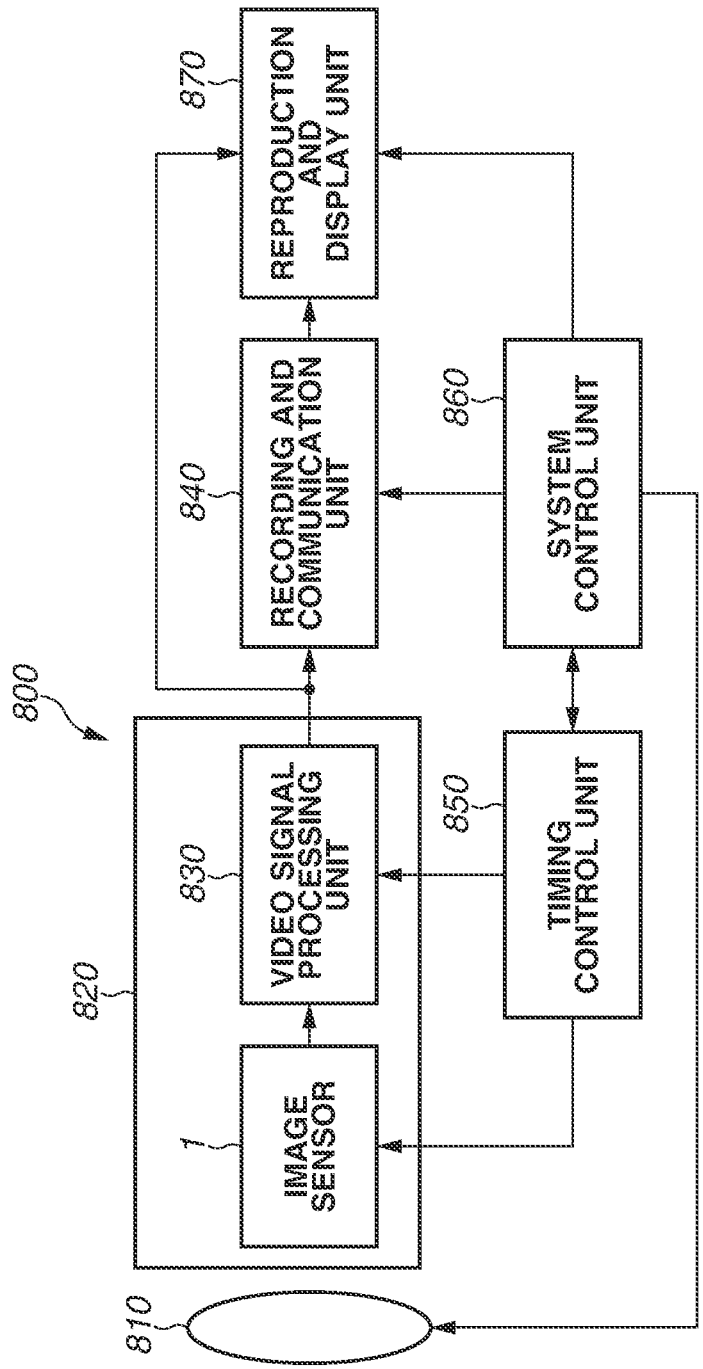
FIG. 9 illustrates a configuration of a photoelectric conversion system.

FIG. 9 illustrates a configuration of a photoelectric conversion system 800 according to a fifth exemplary embodiment of the present disclosure. The photoelectric conversion system 800 includes an optical unit 810, an image sensor 1, a video signal processing unit 830, a recording and communication unit 840, a timing control unit 850, a system control unit 860, and a reproduction and display unit 870. The image sensor 1 and the video signal processing unit 830 cooperatively constitute an imaging apparatus 820. The photoelectric conversion apparatus described in the above-mentioned exemplary embodiment can be used as the image sensor 1.

Light from an imaging object can be guided by the optical unit 810, which is an optical system constituted by a lens, toward the image sensor 1 so that an image of the object can be formed on the pixel array 10A composed of a plurality of pixels disposed in a two-dimensional pattern. The image sensor 1 outputs a signal corresponding to the light imaged on the pixel array 10A at timing determined by a signal from the timing control unit 850.

The signal output from the image sensor 1 can be input to the video signal processing unit 830. The video signal processing unit 830 performs signal processing on the input signal according to a predetermined method. The signal obtained though the processing performed by the video signal processing unit 830 can be transmitted, as image data, to the recording and communication unit 840. The recording and communication unit 840 transmits an image forming signal to the reproduction and display unit 870 and causes the reproduction and display unit 870 to reproduce and display a moving image or a still image. Further, the recording and communication unit 840 receives a signal from the video signal processing unit 830 and communicates with the system control unit 860. In addition, the recording and communication unit 840 performs an operation to record the image forming signal on a recording medium (not illustrated).

The system control unit 860 can control various operations to be performed by an imaging system. More specifically, the system control unit 860 drives and controls the optical unit 810, the timing control unit 850, the recording and communication unit 840, and the reproduction and display unit 870. For example, the system control unit 860 includes a storage device (not illustrated), which is a recording medium storing programs required to control the operations of the imaging system. Further, the system control unit 860 can supply a driving mode switching signal to an internal unit of the imaging system according to a user operation. As practical examples, the system control unit 860 changes a reading target row or a reset target column, changes the field angle during an electronic zooming operation, and shifts the field angle according to an electronic image stabilizing function. The timing control unit 850 controls the driving timings of the image sensor 1 and the video signal processing unit 830 based on the control by the system control unit 860.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-095235, filed May 7, 2015, which is hereby incorporated by reference herein in its entirety.

What is claimed is:

1. An imaging apparatus comprising:
a plurality of pixels constituting a plurality of pixel columns;
a plurality of reading circuits each including an output line, connected to one of the plurality of pixel columns, to which signals from a part of the plurality of pixels are output and a signal processing circuit configured to receive the signals via the output line;
a plurality of first current sources provided in association with the plurality of reading circuits, each of the plurality of first current sources including a first transistor configured to supply a current to one of the plurality of reading circuits;
a plurality of second current sources each including a second transistor configured to supply a reference current to be used as a reference by at least one of the plurality of first current sources;
a first control unit configured to control outputting a current from the first transistor to the reading circuit; and
a second control unit configured to perform selectively supplying a voltage to a gate of the second transistor and holding a voltage at the gate of the second transistor,
wherein
when the second control unit supplies the voltage to the gate of the second transistor, the second transistor supplies the reference current and the first control unit stops outputting the current from the first transistor to the reading circuit, and
when the second control unit holds the voltage at the gate of the second transistor, the first control unit causes the first transistor to output the current from the first transistor to the reading circuit.

2. The imaging apparatus according to claim 1, further comprising a plurality of third transistors provided in association with the plurality of second current sources and each configured to receive the reference current from the second transistor,
wherein one of the plurality of third transistors and the first transistor included in the at least one of the plurality of first current sources constitute a current mirror circuit so that the reference current from the second transistor is used as the reference by the at least one of the plurality of first current sources.

3. The imaging apparatus according to claim 2, wherein respective ones of the plurality of second current sources and respective ones of the plurality of third transistors are provided for every N pieces of pixel columns included in the plurality of pixel columns in a ratio of 1 to N,
the reference current from the second transistor is used as a common reference by N pieces of first current sources included in the plurality of first current sources corresponding to the N pieces of pixel columns, and
the respective one of the third transistors and each of the first transistors included in the N pieces of first current sources constitute the current mirror circuit.

4. The imaging apparatus according to claim 2, wherein the current mirror circuit includes a first gate common circuit disposed on an electric path between the first transistor and the output line and a second gate common circuit disposed on an electric path between the third transistor and the second transistor, and
the second transistor is connected to a gate of the first transistor and a gate of the third transistor.

5. The imaging apparatus according to claim 1, wherein a total number of the plurality of second current sources is less than a total number of the plurality of first current sources, and
the reference current from the second transistor is used as the reference by at least two of the plurality of first current sources.

6. The imaging apparatus according to claim 1, wherein the first control unit includes a first switch that connects the first transistor and the reading circuit,
wherein, by turning on the first switch, the first control unit causes the first transistor to output the current from the first transistor to the reading circuit, and
by turning off the first switch, the first control unit stops outputting the current from the first transistor to the reading circuit.

7. The imaging apparatus according to claim 1, further comprising:
a voltage supply unit configured to supply a voltage to the gate of the second transistor,
wherein the second control unit includes a second switch that connects the voltage supply unit and the gate of the second transistor, and
the voltage from the voltage supply unit is supplied to the gate of the second transistor when the second switch turns on, and
the voltage at the gate of the second transistor is held when the second switch turns off.

8. The imaging apparatus according to claim 1, further comprising:
a node connected to either a source or the drain of the second transistor and receiving a reference voltage; and
a capacitor having a first terminal connected to the gate of the second transistor and a second terminal connected to the node.

9. The imaging apparatus according to claim 1, further comprising:
a third control unit configured to perform selectively supplying a voltage to a gate of the first transistor and holding a voltage at a gate voltage of the first transistor.

10. The imaging apparatus according to claim 9, wherein the third control unit starts holding the voltage at the gate of the first transistor after the second control unit starts holding the voltage at the gate of the second transistor.

11. The imaging apparatus according to claim 1,
wherein each of the plurality of pixels includes an amplifying transistor,
the first transistor is configured to supply a current to the output line, and
the amplifying transistor and the first transistor constitute a source follower circuit.

12. The imaging apparatus according to claim 1, wherein the signal processing circuit includes an amplifier circuit configured to amplify a signal from the output line, and
the first transistor is configured to supply a current to the amplifier circuit.

13. The imaging apparatus according to claim 1,
wherein the signal processing circuit includes an analog to digital conversion circuit configured to convert a signal from the output line into a digital signal, and
the first transistor is configured to supply a current to the analog to digital conversion circuit.

14. An imaging apparatus comprising:
a plurality of pixels constituting a plurality of pixel columns;
a plurality of reading circuits each including an output line, connected to one of the plurality of pixel columns, to which signals from a part of the plurality of pixels are output and a signal processing circuit configured to receive the signals via the output line;
a plurality of first current sources provided in association with the plurality of reading circuits, each of the plurality of first current sources including a first transistor configured to supply a current to one of the plurality of reading circuits;
a plurality of second current sources each including a second transistor configured to supply a reference current;
a plurality of third transistors provided in association with the plurality of second current sources, each being configured to receive the reference current from the second transistor and each constituting a current mirror circuit with each of the first transistors included in at least two of the plurality of first current sources;
a first switch connecting the first transistor and the reading circuit; and
a second switch connected to a gate of the second transistor and configured to set the gate of the second transistor into an electrically floating state.

15. The imaging apparatus according to claim 14,
wherein when the second switch is in an ON state, the second transistor supplies the reference current and the first switch is in an OFF state such that the current from the first transistor is not supplied to the one of the plurality of reading circuits, an
when the second switch is in an OFF state, the first switch is in an ON state such that the current from the first transistor is supplied to the one of the plurality of reading circuits.

16. The imaging apparatus according to claim 14, further comprising:
a voltage supply unit configured to supply a voltage to a gate of the first transistor; and
a third switch connecting the voltage supply unit and the gate of the first transistor.

17. An imaging system comprising:
the imaging apparatus according to claim 1, and
a signal processing apparatus that can process a signal from a photoelectric conversion apparatus.

\* \* \* \* \*